US011524664B2

United States Patent
Motoyama et al.

(10) Patent No.: US 11,524,664 B2
(45) Date of Patent: Dec. 13, 2022

(54) BRAKE CONTROL DEVICE FOR VEHICLE

(71) Applicant: ADVICS CO., LTD., Kariya (JP)

(72) Inventors: Koya Motoyama, Kariya (JP); Hiroki Saito, Okazaki (JP); Masayuki Naito, Nagakute (JP)

(73) Assignee: ADVICS CO., LTD., Kariya (JP)

(*) Notice: Subject to any disclaimer, the term of this patent is extended or adjusted under 35 U.S.C. 154(b) by 522 days.

(21) Appl. No.: 16/638,279

(22) PCT Filed: Aug. 28, 2018

(86) PCT No.: PCT/JP2018/031826
§ 371 (c)(1),
(2) Date: Feb. 11, 2020

(87) PCT Pub. No.: WO2019/044853
PCT Pub. Date: Jul. 3, 2019

(65) Prior Publication Data
US 2020/0180576 A1 Jun. 11, 2020

(30) Foreign Application Priority Data

Aug. 31, 2017 (JP) .............................. JP2017-166620

(51) Int. Cl.
*B60T 8/172* (2006.01)
*B60T 13/18* (2006.01)

(52) U.S. Cl.
CPC .............. *B60T 8/172* (2013.01); *B60T 13/18* (2013.01); *B60T 2270/88* (2013.01)

(58) Field of Classification Search
CPC .......... B60T 8/17; B60T 8/172; B60T 8/4077; B60T 13/18; B60T 13/662; B60T 13/686;
(Continued)

(56) References Cited

U.S. PATENT DOCUMENTS

2005/0012390 A1* 1/2005 Kato ................... B60T 8/1755
303/146
2015/0291136 A1* 10/2015 Ninoyu .................... B60T 8/17
701/70
(Continued)

FOREIGN PATENT DOCUMENTS

JP 2007-331538 A 12/2007

OTHER PUBLICATIONS

International Search Report dated Nov. 6, 2018 in PCT/JP2018/031826 filed on Aug. 28, 2018.

*Primary Examiner* — Robert A. Siconolfi
*Assistant Examiner* — San M Aung
(74) *Attorney, Agent, or Firm* — Oblon, McClelland, Maier & Neustadt, L.L.P.

(57) ABSTRACT

A control device is provided with a flow rate derivation part for deriving a pressure-holding-valve flow rate on the basis of a pressure command value and a previous pressure command value; a differential pressure derivation part for deriving a differential-pressure-valve differential pressure value so that the differential-pressure-valve differential pressure value increases with an increase in the difference obtained by subtracting the pressure-holding-valve flow rate from a pump-discharge flow rate; and a pressure-holding-valve processing part for performing an aperture derivation process to derive a command aperture so that the command aperture decreases with an increase in the difference obtained by subtracting the pressure command value from the sum of an pressure value and the differential-pressure-valve differential pressure value, and driving a holding pressure valve at the command aperture.

4 Claims, 6 Drawing Sheets

(58) Field of Classification Search
CPC ...... B60T 13/146; B60T 2270/88; B60T 1/10; B60T 7/042; B60L 7/26
USPC ...................................... 303/3, 146; 701/70
See application file for complete search history.

(56) References Cited

U.S. PATENT DOCUMENTS

2016/0200298 A1   7/2016  Saito
2016/0339889 A1* 11/2016  Okano .................... B60T 7/042
2018/0201245 A1*  7/2018  Kamiya ................... B60T 8/00

* cited by examiner

BRAKE CONTROL DEVICE FOR VEHICLE

TECHNICAL FIELD

The present invention relates to a brake control device for a vehicle configured to control a fluid pressure in wheel cylinders provided for respective wheels.

BACKGROUND ART

In PTL 1, an example of a brake device is disclosed, which includes a differential pressure adjustment valve arranged on a fluid line for connecting a master cylinder with wheel cylinders, a holding valve arranged on a fluid line on a wheel cylinder side of the differential pressure adjustment valve, and a pump for discharging a brake fluid between the differential pressure adjustment valve and the holding valve.

In the brake device, a differential pressure can be generated between a master cylinder side and a wheel cylinder side of the differential pressure adjustment valve by discharging the brake fluid from the pump while adjusting an opening degree of the differential pressure adjustment valve. In this case, a fluid pressure in a fluid line between the differential pressure adjustment valve and the holding valve is substantially equal to the sum of a differential pressure command value for the differential pressure adjustment valve and a fluid pressure in the master cylinder. Therefore, when the holding valve is driven under a situation where such a differential pressure is generated, a command opening degree for the holding valve is derived based on the sum of a differential pressure command value for the differential pressure adjustment valve and the fluid pressure in the master cylinder and also on an indicated fluid pressure value in the wheel cylinders. As a result, it is possible to more accurately control the fluid pressure in the wheel cylinders.

CITATION LIST

Patent Literature

PTL 1: JP-A-2007-331538

SUMMARY OF INVENTION

Technical Problem

However, there is a case where the fluid pressure in the wheel cylinders is adjusted by driving the holding valve when the brake fluid is discharged from the pump under a situation where the differential pressure adjustment valve is not driven and thus the differential pressure adjustment valve is fully opened. In this case, the differential pressure command value for the differential pressure adjustment valve is equal to "0". Therefore, the command opening degree for the holding valve is derived under the assumption that a differential pressure is not generated between the master cylinder side and the wheel cylinder side of the differential pressure adjustment valve, i.e., that the fluid pressure in the fluid line between the differential pressure adjustment valve and the holding valve is equal to the fluid pressure in the master cylinder.

However, the differential pressure adjustment valve is provided with parts forming an orifice. Therefore, if the brake fluid is discharged from the pump under the situation where the differential pressure adjustment valve is not driven, a differential pressure is generated between the master cylinder side and the wheel cylinder side of the differential pressure adjustment valve even though the differential pressure command value for the differential pressure adjustment valve is equal to "0". As a result, if the command opening degree for the holding valve is set under the assumption that a differential pressure is not generated between the master cylinder side and the wheel cylinder side of the differential pressure adjustment valve as described above, the fluid pressure in the wheel cylinders becomes higher than an command value for the fluid pressure. Accordingly, there is a room for improvement in terms of enhancing controllability on the fluid pressure in the wheel cylinders when the brake fluid is discharged from the pump under the situation where the differential pressure adjustment valve is not driven.

Solution to Problem

In order to solve the above objects, a brake control device for a vehicle is applied to a brake device for the vehicle, which includes a differential pressure adjustment valve arranged between a master cylinder and wheel cylinders provided for respective wheels; a holding valve arranged between the differential pressure adjustment valve and the wheel cylinders; and a pump for discharging a brake fluid between the differential pressure adjustment valve and the holding valve. If a control state where the differential pressure adjustment valve is not driven and also the brake fluid is discharged from the pump is referred to as a prescribed control state, the brake control device for the vehicle includes a wheel fluid pressure derivation unit for deriving an fluid pressure in the wheel cylinders every control cycle; a passing-flow-rate derivation unit for deriving a holding-valve-passing flow rate based on a fluid pressure and a previous fluid pressure in the wheel cylinders derived by the wheel fluid pressure derivation unit in the prescribed control state, wherein the holding-valve-passing flow rate is an amount of the brake fluid flowing through the holding valve to a wheel cylinder side thereof in accordance with a change in fluid pressure in the wheel cylinders; a differential pressure derivation unit for deriving a differential pressure between a master cylinder side and a wheel cylinder side of the differential pressure adjustment valve in the prescribed control state in such a manner that the differential pressure is increased as a difference obtained by subtracting the holding-valve-passing flow rate derived by the passing-flow-rate derivation unit from a brake fluid discharge flow rate of the pump is increased; and a holding valve operating unit for executing an opening degree derivation process of deriving a command opening degree for the holding valve and also for driving the holding valve at the command opening degree derived by the opening degree derivation process in the prescribed control state, in such a manner that the command opening degree is decreased as a difference obtained by subtracting the fluid pressure in the wheel cylinders derived by the wheel fluid pressure derivation unit from the sum of the differential pressure derived by the differential pressure derivation unit and a fluid pressure in the master cylinder is increased.

In the case of the prescribed control state, the differential pressure adjustment valve is not driven. Therefore, even though the differential pressure adjustment valve is fully opened, a differential pressure between the master cylinder side and the wheel cylinder side of the differential pressure adjustment valve is generated. In the case of the prescribed control state, the inventors obtained the following knowledge. A pressure loss when a brake fluid passes through the differential pressure adjustment valve to the master cylinder side is increased as a flow rate of the brake fluid flowing through the differential pressure adjustment valve to the master cylinder side is increased. Also, the larger the pressure loss is, the larger a differential pressure between the master cylinder side and the wheel cylinder side of the differential pressure adjustment valve becomes.

Accordingly, in the above configuration, the holding-valve-passing flow rate, which is a flow rate of the brake fluid flowing through the holding valve to the wheel cylinder side, is derived when the opening degree of the holding valve is changed under the situation of the prescribed control state. At this time, the difference obtained by subtracting the holding-valve-passing flow rate from the brake fluid discharge flow rate of the pump is a flow rate of the brake fluid flowing through the differential pressure adjustment valve to the master cylinder side. The flow rate of the brake fluid flowing through the differential pressure adjustment valve to the master cylinder side is a value correlated with the pressure loss. Therefore, it is possible to derive the differential pressure between the master cylinder side and the wheel cylinder side of the differential pressure adjustment valve based on the flow rate of the brake fluid flowing through the differential pressure adjustment valve to the master cylinder side. That is, the differential pressure between the master cylinder side and the wheel cylinder side of the differential pressure adjustment valve is calculated such that the larger the flow rate of the brake fluid flowing through the differential pressure adjustment valve to the master cylinder side is, the larger the differential pressure becomes. Also, the command opening degree for the holding valve is derived based on the sum of the differential pressure and the fluid pressure in the master cylinder and also on the fluid pressure in the wheel cylinders, and then the holding valve is driven at the command opening degree, thereby allowing the fluid pressure in the wheel cylinders to be more accurately controlled.

Therefore, according to the above configuration, even in the case of the prescribed control state, controllability for the fluid pressure in the wheel cylinders can be enhanced by calculating the differential pressure between the master cylinder side and the wheel cylinder side of the differential pressure adjustment valve and then driving the holding valve at the command opening degree obtained by taking the differential pressure into account.

DESCRIPTION OF EMBODIMENTS

Hereinafter, one embodiment embodying a brake control device for a vehicle will be described with reference to FIGS. 1 to 9.

Figure 1:
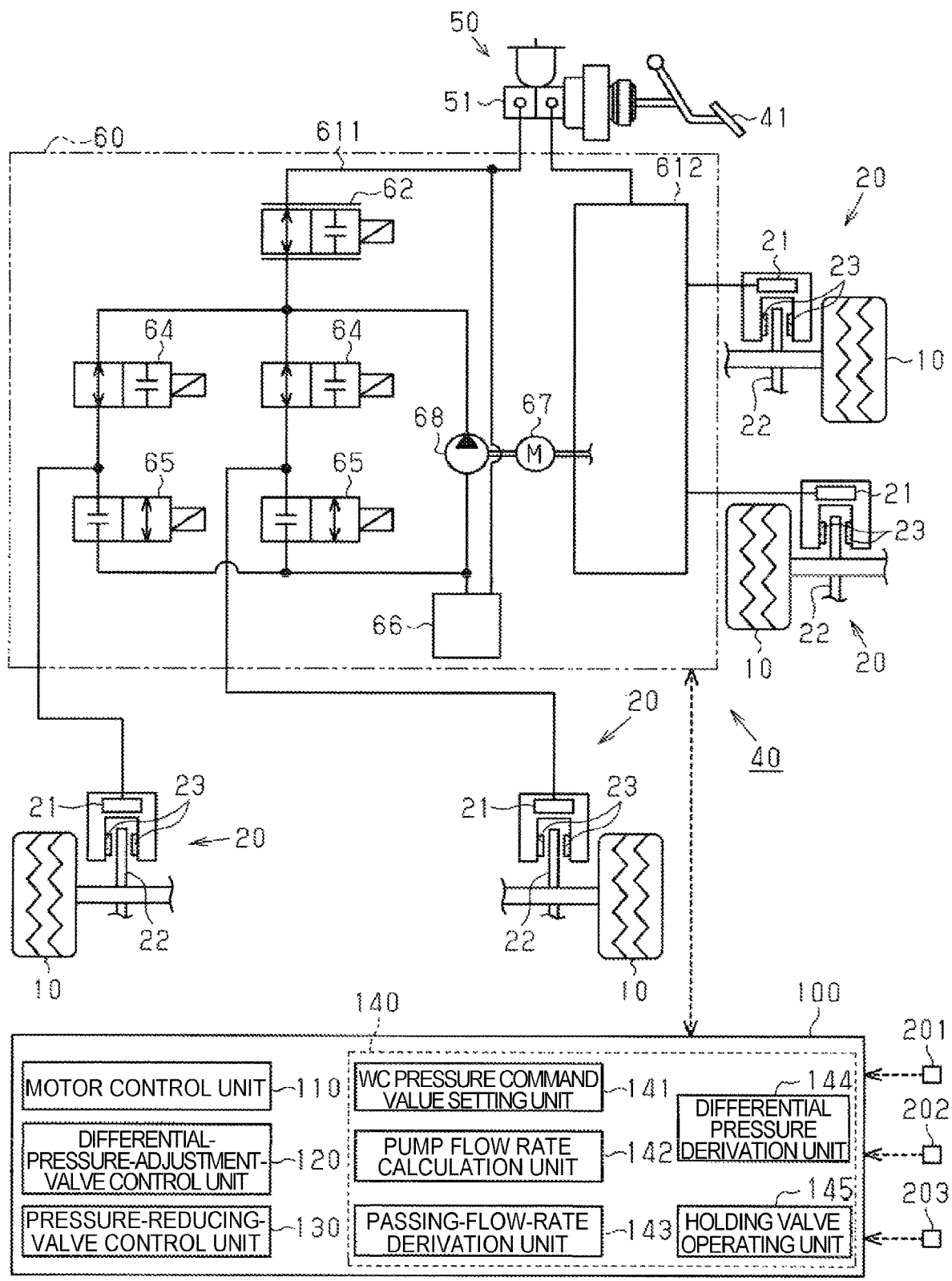
FIG. 1 is a schematic configuration view showing a part of a brake device having a control device as one embodiment of a brake control device for a vehicle.

A vehicle shown in FIG. 1 includes a brake device 40 having a control device 100 as an example of the brake control device of the present embodiment, and a plurality of braking mechanisms 20 provided respectively for a plurality (i.e., the same number as that of the wheels) of wheels 10.

As shown in FIG. 1, each of the braking mechanisms 20 includes a wheel cylinder 21 configured to be supplied with a brake fluid, a rotational body 22 configured to rotate integrally with the respective wheel 10, and a frictional material 23 configured to relatively move in directions toward and away from the rotational body 22. Also, each of the braking mechanisms 20 can increase a force pressing the frictional material 23 against the rotational body 22, i.e., a braking force on the respective wheel 10, as a WC pressure Pwc which is a fluid pressure in the wheel cylinder 21 is increased.

The brake device 40 includes a fluid pressure generation device 50 connected with a braking operation member 41, such as a brake pedal, operated by a driver, and a braking actuator 60 capable of individually adjusting a WC pressure Pwc in each of the wheel cylinders 21.

The fluid pressure generation device 50 has a master cylinder 51. An MC pressure Pmc, which is a fluid pressure generated in the master cylinder 51, is increased as an amount of operation of the braking operation member 41 by the driver is increased.

The braking actuator 60 is provided with two hydraulic circuits 611, 612. Two of the wheel cylinders 21 are connected to the first hydraulic circuit 611. Also, the other two of the wheel cylinders 21 are connected to the second hydraulic circuit 612.

The first hydraulic circuit 611 has a differential pressure adjustment valve 62 arranged between the master cylinder 51 and the wheel cylinders 21, holding valves 64 configured to be closed when an increase in the WC pressure Pwc needs to be limited, and pressure reducing valves 65 configured to be opened when the WC pressure Pwc needs to be reduced. The differential pressure adjustment valve 62 is a normally-open type linear electromagnetic valve and is driven to adjust a differential pressure, which is a pressure difference between the master cylinder 51 side of the differential pressure adjustment valve 62 and the wheel cylinder 21 side of the differential pressure adjustment valve 62. Each of the holding valves 64 is arranged on a fluid line on the wheel cylinder 21 side of the differential pressure adjustment valve 62. The holding valve 64 is a normally-open type electromagnetic valve and is driven to adjust a differential pressure, which is a pressure difference between the differential pressure adjustment valve 62 side of the holding valve 64 and the wheel cylinder 21 side of the holding valve 64.

Further, the first hydraulic circuit 611 is connected with a reservoir 66 for temporally storing a brake fluid flowed out from the wheel cylinders 21 via the respective pressure reducing valves 65, and also with a pump 68 operated in accordance with driving of an electric motor 67. The pump 68 is configured to pump up a brake fluid in the reservoir 66 and a brake fluid in the master cylinder 51 and to discharge the brake fluid into a fluid line between the differential pressure adjustment valve 62 and the holding valves 64.

On the other hand, the structure of the second hydraulic circuit 612 is substantially the same as that of the first hydraulic circuit 611, and accordingly, the description of the structure of the second hydraulic circuit 612 will be omitted herein.

Next, a configuration of the differential pressure adjustment valve 62 will be described with reference to FIG. 2.

Figure 2:
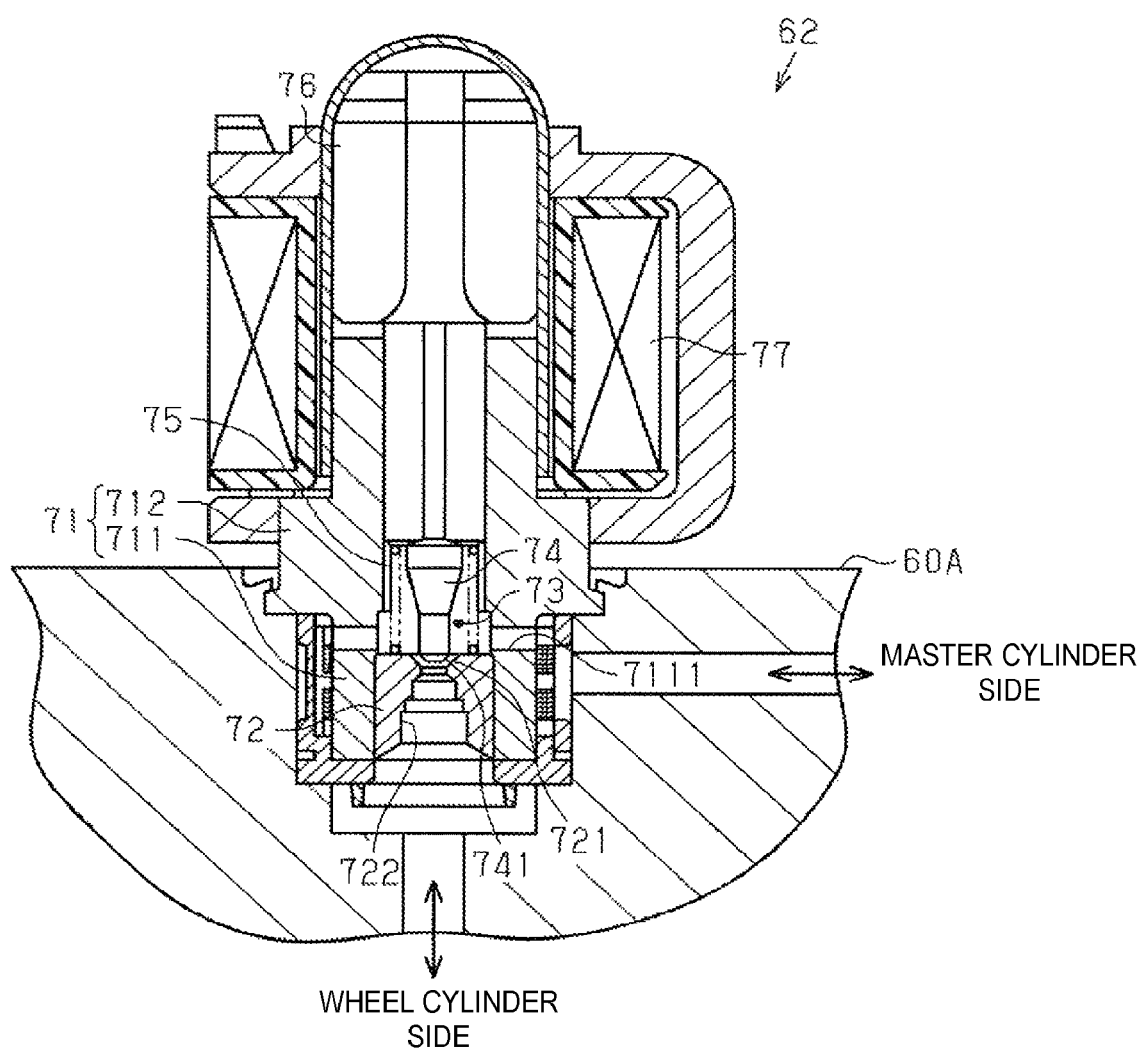
FIG. 2 is a schematic sectional view showing a differential pressure adjustment valve constituting the brake device.

As shown in FIG. 2, the differential pressure adjustment valve 62 includes a generally cylindrical-shaped guide 71 attached to a housing 60A of the braking actuator 60 and extending in an axial direction which is a vertical direction in the figure. The guide 71 has a base portion 711, which is a lower portion in the figure, and a distal portion 712, which is an upper portion in the figure. The base portion 711 has a seat 72 press-fitted therein. In addition, a valve chamber 73 is formed at a location inside the guide 71, which is located above the seat 72 in the figure.

The seat 72 has a valve seating surface 721 formed on a side thereof facing the valve chamber 73 and an inflow passage 722 extending from the valve seating surface 721 in an axial direction (specifically, in a downward direction in the figure). The inflow passage 722 is communicated with the wheel cylinder 21 side. Therefore, communication of a brake fluid between the valve chamber 73 and the wheel cylinder 21 is performed via the inflow passage 722.

On a peripheral wall of the base portion 711 of the guide 71, an outflow passage 7111 is provided to be communicated with the valve chamber 73. The outflow passage 7111 is communicated with the master cylinder 51 side. Therefore, outflow of the brake fluid from the valve chamber 73 to the master cylinder 51 side and inflow of the brake fluid from the master cylinder 51 side into the valve chamber 73 are performed via the outflow passage 7111.

Also, the differential pressure adjustment valve 62 has a valve body 74 configured to move inside the distal portion 712 of the guide 71 in directions toward and away from the valve seating surface 721. A distal end 741 of the valve body 74, which is a lower end thereof in the figure, can be seated on the valve seating surface 721 of the seat 72. If the valve body 74 is seated on the valve seating surface 721, the inflow passage 722 opened in the valve seating surface 721 is closed by the valve body 74, thereby blocking communication between the valve chamber 73 and the wheel cylinder 21. On the other hand, the valve body 74 is urged in a direction away from the valve seating surface 721 (i.e., in an upward direction in the figure) by a coil spring 75.

Further, the differential pressure adjustment valve 62 has a plunger 76 fixed to the valve body 74 and a solenoid 77 positioned outward radially from the valve body 74 and the plunger 76. The solenoid 77 is configured such that if a control signal from the control device 100 of the brake device 40 is inputted thereto, an electric current having a magnitude corresponding to the control signal flows therethrough. Then, as the current flows through the solenoid 77, an electromagnetic force is created. The electromagnetic force acts in a direction opposite to a direction urged by the coil spring 75, i.e., in a direction of pressing the valve body 74 and the plunger 76 against the valve seating surface 721 (i.e., in the downward direction in the figure). Therefore, by adjusting a magnitude of the current flowing through the solenoid 77, i.e., a differential pressure command value for the differential pressure adjustment valve 62, a force for pressing the valve body 74 against the valve seating surface 721 can be adjusted.

On the other hand, an intermediate fluid pressure Pmid in the hydraulic circuits 611, 622, which is a fluid pressure in a fluid line between the differential pressure adjustment valve 62 and the holding valve 64, can be adjusted by driving the differential pressure adjustment valve 62 and also operating the pump 68. That is, if the differential pressure adjustment valve 62 is driven while a brake fluid is discharged from the pump 68, a differential pressure corresponding to the differential pressure command value for the differential pressure adjustment valve 62 is generated between the master cylinder 51 side and the wheel cylinder 21 side of the differential pressure adjustment valve 62. Therefore, the sum of the MC pressure Pmc in the master cylinder 51 and the differential pressure command value is derived as the intermediate fluid pressure Pmid.

However, in the differential pressure adjustment valve 62, a gap between the distal end 741 of the valve body 74 and the valve seating surface 721 of the seat 72 is narrow as shown in FIG. 2. Therefore, when a brake fluid is discharged from the pump 68, the gap between the valve body 74 and the valve seating surface 721 functions as a orifice causing a pressure loss when the brake fluid flows through the differential pressure adjustment valve 62 to the master cylinder 51 side, even if the differential pressure command value is equal to "0" and thus the differential pressure adjustment valve 62 is not driven, i.e., even if the differential pressure adjustment valve 62 is fully opened. Therefore, even though the differential pressure adjustment valve 62 is not driven and thus the differential adjustment valve 62 is fully opened, a differential pressure is generated between the master cylinder 51 side and the wheel cylinder 21 side of the differential pressure adjustment valve 62.

Meanwhile, in the present embodiment, such a differential pressure generated between the master cylinder 51 side and the wheel cylinder 21 side of the differential pressure adjustment valve 62 is referred to as a "differential-pressure-valve differential pressure DPsm". Also, a control state where the differential pressure adjustment valve 62 is not driven and also a brake fluid is discharged from the pump 68 is referred to as a "prescribed control state".

Next, the control device 100 will be described with reference to FIG. 1.

As shown in FIG. 1, signals from various detection systems, such as a braking switch 201, a fluid pressure detection sensor 202 and a wheel speed sensor 203, are inputted to the control device 100. The braking switch 201 is configured to output a signal corresponding to whether or not operation of the braking operation member 41 is present. The fluid pressure detection sensor 202 is configured to output a signal corresponding to the MC pressure Pmc. The wheel speed sensor 203 is provided in the same number as the wheels 10 and is configured to output a signal corresponding to a wheel speed VM of the corresponding wheels 10.

The control device 100 has a motor control unit 110, a differential-pressure-adjustment-valve control unit 120, a pressure-reducing-valve control unit 130 and a holding valve control unit 140 as functional units for controlling the braking actuator 60.

The motor control unit 110 is configured to control driving of the electric motor 67, thereby adjusting a discharging flow rate of the brake fluid from the pump 68. That is, the motor control unit 110 can increase the discharging flow rate of the brake fluid from the pump 68 by increasing a rotational speed of the electric motor 67.

The differential-pressure-adjustment-valve control unit 120 is configured to derive a differential pressure command value and then to control driving of the differential pressure adjustment valve 62 based on the differential pressure command value. That is, the differential-pressure-adjustmentvalve control unit 120 can increase the differential-pressure-valve differential pressure DPsm, i.e., the intermediate fluid pressure Pmid by increasing the differential pressure command value.

The pressure-reducing-valve control unit 130 is configured to control driving of the pressure reducing valve 65. For example, upon execution of anti-lock brake control, if the WC pressure Pwc needs to be reduced, the pressure-reducing-valve control unit 130 drives the pressure reducing valve 65 to be opened. Also, for example, upon execution of anti-lock brake control, if the WC pressure Pwc needs to be remained or the WC pressure Pwc needs to be increased, the pressure-reducing-valve control unit 130 holds the pressure reducing valve 65 closed.

The holding valve control unit 140 is configured to control driving of the holding valve 64. For example, upon execution of anti-lock brake control, if the WC pressure Pwc needs to be reduced or the WC pressure Pwc needs to be kept, the holding valve control unit 140 holds the holding valve 64 closed. Also, upon execution of anti-lock brake control, if the WC pressure Pwc needs to be increased, the holding valve control unit 140 adjusts an opening degree of the holding valve 64, thereby adjusting a pressure increase rate of the WC pressure Pwc.

The holding valve control unit 140 has a WC pressure command value setting unit 141, a pump flow rate calculation unit 142, a passing-flow-rate derivation unit 143, a differential pressure derivation unit 144 and a holding valve operating unit 145 as functional units for controlling driving of the holding valve 64 when in the prescribed control state.

The WC pressure command value setting unit 141 is configured to set a WC pressure command value PwcI, which is a command value for the WC pressure Pwc, every a predetermined control cycle. In the case of the prescribed control state, driving of the holding valve 64 is controlled such that the WC pressure Pwc is close to the WC pressure command value PwcI. That is, it can be said that the WC pressure command value setting unit 141 derives the WC pressure Pwc every the control cycle. Therefore, in the present embodiment, the WC pressure command value setting unit 141 functions as one example of a "wheel pressure derivation unit".

The pump flow rate calculation unit 142 is configured to calculate a pump discharge flow rate FRpmp, which is a discharge flow rate of a brake fluid per unit time in the pump 68. As used herein, the "unit time" is the same as a time length of the control cycle. The pump flow rate calculation unit 142 calculates the pump discharge flow rate FRpmp in such a manner that the higher the rotational speed of the electric motor 67 controlled by the motor control unit 110 is, the larger the pump discharge flow rate FRpmp becomes.

The passing-flow-rate derivation unit 143 is configured to derive a holding-valve passing flow rate FRno, which is an amount of the brake fluid flowing through the holding valve 64 to the wheel cylinder 21 side in accordance with an change in the WC pressure Pwc, based on a WC pressure command value PwcI and a previous WC command value PwcI set by the WC pressure command value setting unit 141. As used herein, the previous WC pressure command value PwcI is a WC pressure command value PwcI set by the WC pressure command value setting unit 141 at a previous control cycle. Also, if the WC pressure command value PwcI has been increased, i.e., if the WC pressure command value PwcI is larger than the previous WC pressure command value PWcI, the holding-valve-passing flow rate FRno is a positive value since an amount of a brake fluid in the wheel cylinder 21 has been increased.

The differential pressure derivation unit 144 is configured to derive a differential-pressure-valve differential pressure DPsm in such a manner that the larger a difference obtained by subtracting the holding-valve-passing flow rate FRno derived by the passing-flow rate derivation unit 143 from the pump discharge flow rate FRpmp calculated by the pump flow rate calculation unit 142 is, the larger the differential-pressure-valve differential pressure DPsm becomes.

The holding valve operating unit 145 is configured to execute a first opening degree derivation process for deriving a command opening degree Ino for the holding valve 64 without using the differential-pressure-valve differential pressure DPsm calculated by the differential pressure derivation unit 144, and a second opening degree derivation process for deriving the command opening degree Ino for the holding valve 64 using the differential-pressure-valve differential pressure DPsm calculated by the differential pressure derivation unit 144. Also, the holding valve operating unit 145 is configured to drive the holding valve 64 at the command opening degree Ino derived by the first opening degree derivation process or the second opening degree deviation process.

In the present embodiment, the holding valve operating unit 145 drives the holding valve 64 at the command opening degree Ino derived by the first opening degree derivation process when it starts to increase the WC pressure Pwc by releasing a state where the holding valve 64 is closed. That is, in the first opening degree derivation process, the holding valve operating unit 145 derives a difference obtained by subtracting the WC pressure command value PwcI set by the WC pressure command value setting unit 141 from a sum obtained by adding a correction value $\Delta$Pof to the MC pressure Pmc (=(Pmc+$\Delta$Pof)−PwcI(N)) and then derives the command opening degree Ino in such a manner that the larger the difference is, the smaller the command opening degree Ino becomes. Therefore, in the present embodiment, the first opening degree derivation process corresponds to one example of "additional opening derivation process" in which the command opening degree Ino is derived based on the difference (=(Pmc+$\Delta$Pof)−PwcI).

The holding valve operating unit 145 starts to drive the holding valve 64 at a command opening degree Ino derived by the second opening degree derivation process under the condition that the holding valve 64 is driven at the command opening degree Ino derived by the first opening degree derivation process. That is, in the second opening degree derivation process, the holding valve operating unit 145 derives a difference obtained by subtracting the WC pressure command value PwcI set by the WC pressure command value setting unit 141 from a sum of the differential-pressure-valve differential pressure DPsm derived by the differential pressure derivation unit 144 and the MC pressure Pmc (=(Pmc+DPsm)−PwcI(N)) and then derives the command opening degree Ino in such a manner that the larger the difference is, the smaller the command opening degree Ino becomes. Therefore, in the present embodiment, the second opening degree derivation process corresponds to one example of an "opening degree derivation process" in which the command opening degree Ino is derived based on the difference (=(Pmc+DPsm)−PwcI(N)).

Next, a process routine executed by the holding valve control unit 140 when the WC pressure Pwc is adjusted by driving the holding valve 64 under the situation of the prescribed control state will be described with reference to FIGS. 3 to 7. Meanwhile, the present process routine is executed every the predetermined control cycle.

Figure 3:
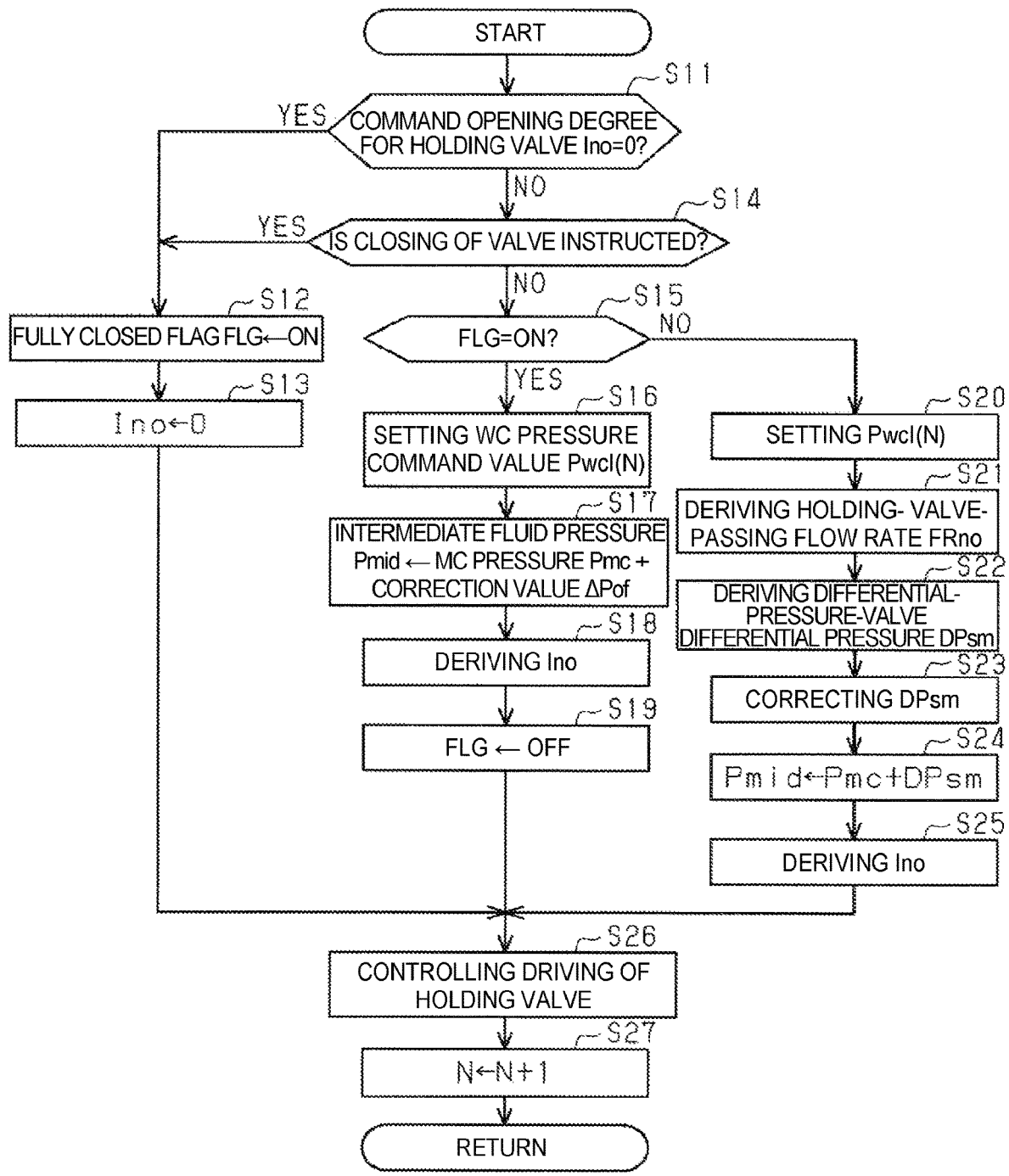
FIG. 3 is a flow chart explaining an operation routine executed to drive a holding valve when in a specified control state.

As shown in FIG. 3, at a first step S11 in the present process routine, it is determined whether or not the command opening degree Ino for the holding valve 64 is equal to "0". That is, it can be determined here whether or not the holding valve 64 is closed. If the command opening degree Ino is equal to "0" (S11: YES), the process proceeds to the next step S12. At the step S12, a fully closed flag FLG is set to ON. The fully closed flag FLG is a flag, which is set to ON when the holding valve 64 has been closed, but to OFF when the holding valve 64 has not been closed. Subsequently, at the next step S13, the command opening degree Ino for the holding valve 64 is remained at "0" by the holding valve operating unit 145. Then, the process proceeds to a step S26 as described below.

On the other hand, if it is determined at the step S11 that the command opening degree Ino for the holding valve 64 is not "0" (NO), the process proceeds to the next step S14. Then, at the step S14, it is determined whether or not closing of the holding valve 64 is instructed. For example, upon execution of anti-lock brake control, closing of the holding valve 64 has been instructed when the WC pressure Pwc needs to be reduced or the WC pressure Pwc needs to be remained. Then, if closing has been instructed (S14: YES), the process proceeds to the above step S12. On the other hand, if closing has not been instructed (S14: NO), the process proceeds to the next step S15.

At the step S15, it is determined whether or not the fully closed flag FLG has been set to ON. If it is determined that the fully closed flag FLG has been set to ON (S15: YES), the process proceeds to the next step S16. At the step S16, the WC pressure command value PwcI(N) is set by the WC pressure command value setting unit 141. For example, the WC pressure command value PwcI (N) is set based on a wheel speed VW of the wheels 10. Once the WC pressure command value PwcI (N) is set in this way, the first opening degree derivation process is executed by the holding valve operating unit 145 (S17, S18).

That is, at the step S17, the intermediate fluid pressure Pmid is calculated by the holding valve operating unit 145. Specifically, the holding valve operating unit 145 obtains as the intermediate fluid pressure Pmid the sum of the MC pressure Pmc and the correction value ΔPof. Then, at the next step S18, the command opening degree Ino for the holding valve 64 is set by the holding valve operating unit 145, based on a holding-valve differential pressure DPno, which is a difference obtained by subtracting the WC pressure command value PwcI (N) set at the step S16 from the intermediate fluid pressure Pmid calculated at the step S17. For example, the holding valve operating unit 145 sets the command opening degree Ino by referring to a map shown in FIG. 4.

Figure 4:
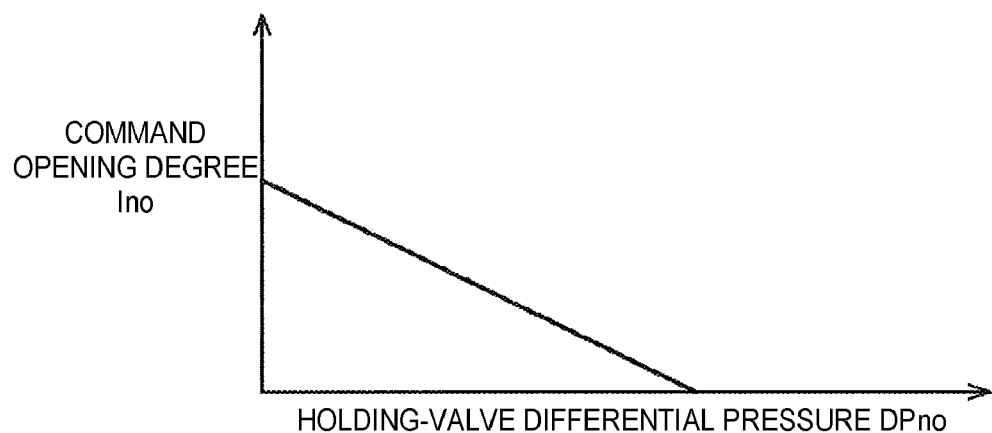
FIG. 4 is a map referred to obtain an indicated opening degree.

The map shown in FIG. 4 is a map representing a relationship between the command opening degree Ino and the holding-valve differential pressure DPno. As shown in FIG. 4, the larger the holding-valve differential pressure DPno is, the smaller the command opening degree Ino becomes. Therefore, by referring to the map, the holding valve operating unit 145 can set the command opening degree Ino in such a manner that the larger the holding-valve differential pressure DPno is, the smaller the command opening degree Ino becomes.

Returning to FIG. 3, once the command opening degree Ino is set by the first opening degree derivation process, the process proceeds to the next step S19. Then, at the step S19, the fully closed flag FLG is set to OFF. Then, the process proceeds to the step S26 as described below.

On the other hand, if it is determined at the step S15 that the fully closed flag FLG has been set to OFF (NO), the process proceeds to the next step S20. At the step S20, the WC pressure command value PwcI(N) is set by the WC pressure command value setting unit 141. Once the WC pressure command value PwcI(N) is set in this way, the second opening degree derivation process is executed by the holding valve operating unit 145 (S21 to S25).

That is, at the next step S21, the holding-valve passing flow rate FRno is derived by the passing-flow-rate derivation unit 143. For example, the passing-flow-rate derivation unit 143 derives the holding-valve passing flow rate FRno by referring to a map shown in FIG. 5.

Figure 5:
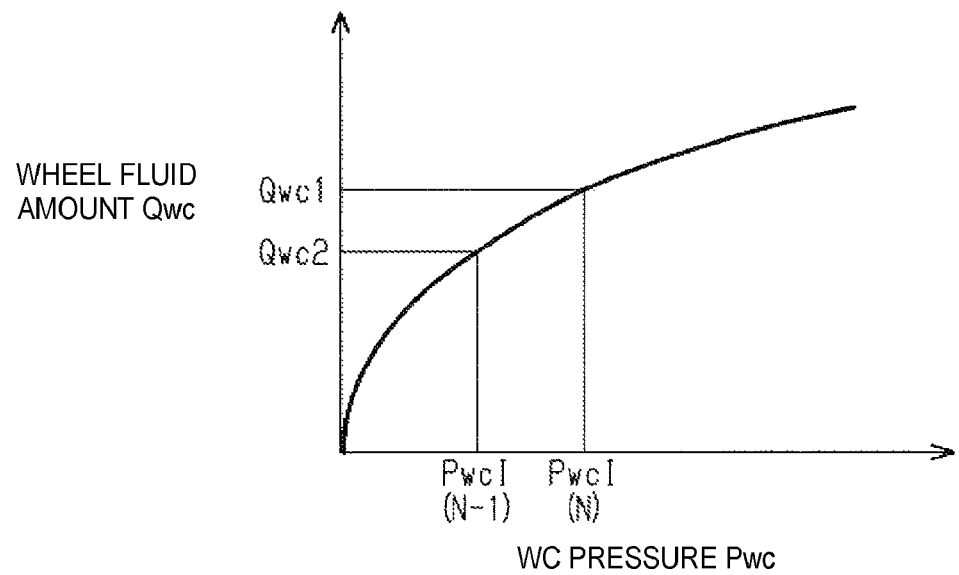
FIG. 5 is a map referred to obtain a wheel fluid amount, which is an amount of a brake fluid in the wheel cylinder.

The map shown in FIG. 5 is a map representing a relationship between the WC pressure Pwc and a wheel fluid amount Qwc, which is an amount of the brake fluid in the wheel cylinder 21. As shown in FIG. 5, the higher the WC pressure Pwc is, the larger the wheel fluid amount Qwc becomes. By referring to the map, the passing-flow-rate derivation unit 143 derives a first wheel fluid amount Qwc1 corresponding to the WC pressure command value PwcI (N) and a second wheel fluid amount Qwc2 corresponding to the previous WC pressure command value PwcI(N−1). Then, the passing-flow-rate derivation unit 143 can derive the holding-valve passing flow rate FRno by dividing a difference, which is obtained by subtracting the second wheel fluid amount Qwc2 from the first wheel fluid amount Qwc1, by the control cycle. That is, the holding-valve passing flow rate FRno can be expressed by a relational expression (Eq. 1) as shown below. Meanwhile, the term "CS" in the relational expression (Eq. 1) is a time length of the control cycle.

$$FRno=(Qwc1-Qwc2)/CS \quad\quad\quad (Eq. 1)$$

Returning to FIG. 3, once the holding-valve passing flow rate FRno is derived, the process proceeds to the next step S22. Then, at the step S22, the differential-pressure-valve differential pressure DPsm is calculated by the differential pressure derivation unit 144. For example, the differential pressure derivation unit 144 derives the differential-pressure-valve differential pressure DPsm by referring to a map shown in FIG. 6.

Figure 6:
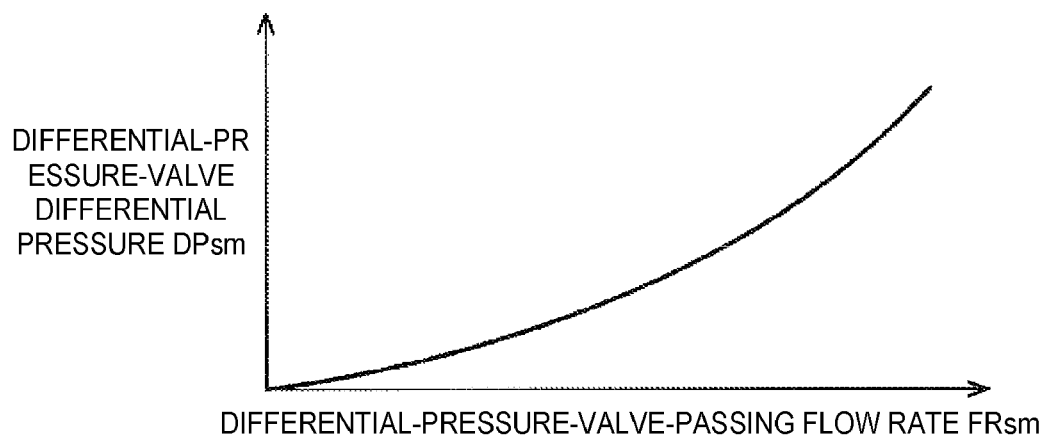
FIG. 6 is a map referred to obtain a differential-pressure-valve differential pressure.

The map shown in FIG. 6 is a map representing a relationship between a differential-pressure-valve passing flow rate FRsm, which is a flow rate of the brake fluid passing through the differential pressure adjustment valve 62 to the master cylinder 51 side, and the differential-pressure-valve differential pressure DPsm. The larger the differential-pressure-valve passing flow rate FRsm is, the higher a pressure loss when the brake fluid passes through the differential pressure adjustment valve 62 to the master cylinder 51 side becomes. Also, the higher the pressure loss is, the higher the differential-pressure-valve differential pressure DPsm becomes. Therefore, as shown in FIG. 6, the larger the differential-pressure-valve passing flow rate FRsm is, the higher the differential-pressure-valve differential pressure DPsm becomes.

The differential pressure derivation unit 144 obtains as the differential-pressure-valve passing flow rate FRsm a difference obtained by subtracting the holding-valve passing flow rate FRno derived in the step S21 from the pump discharge flow rate FRpmp calculated by the pump flow rate calculation unit 145. Also, the differential pressure derivation unit 144 derives a value corresponding to the differential-pressure-valve passing flow rate FRsm from the map shown in FIG. 6, and then employs the value as the differential-pressure-valve differential pressure DPsm. In this way, the differential pressure derivation unit 144 can derive the differential-pressure-valve differential pressure DPsm in such a manner that the larger the differential-pressure-valve passing flow rate FRsm is, the higher the differential-pressure-valve differential pressure DPsm becomes.

Returning to FIG. 3, once the differential-pressure-valve differential pressure DPsm is derived, the process proceeds to the next step S23. Then, at the step S23, a correction process on the differential-pressure-valve differential pressure DPsm calculated at the step S22 is executed by the differential pressure derivation unit 144. That is, the lower a temperature of the brake fluid flowing through the braking actuator 60 is, the higher a viscosity of the brake fluid becomes and correspondingly the higher the pressure loss when the brake fluid passes through the differential pressure adjustment valve 62 to the master cylinder 51 side is likely to become. Therefore, the differential pressure derivation unit 144 corrects the differential-pressure-valve differential pressure DPsm in such a manner that the lower the temperature of the brake fluid is, the higher the differential-pressure-valve differential pressure DPsm becomes. At this time, the differential pressure derivation unit 144 corrects the differential-pressure-valve differential pressure DPsm by referring to a map shown in FIG. 7.

Figure 7:
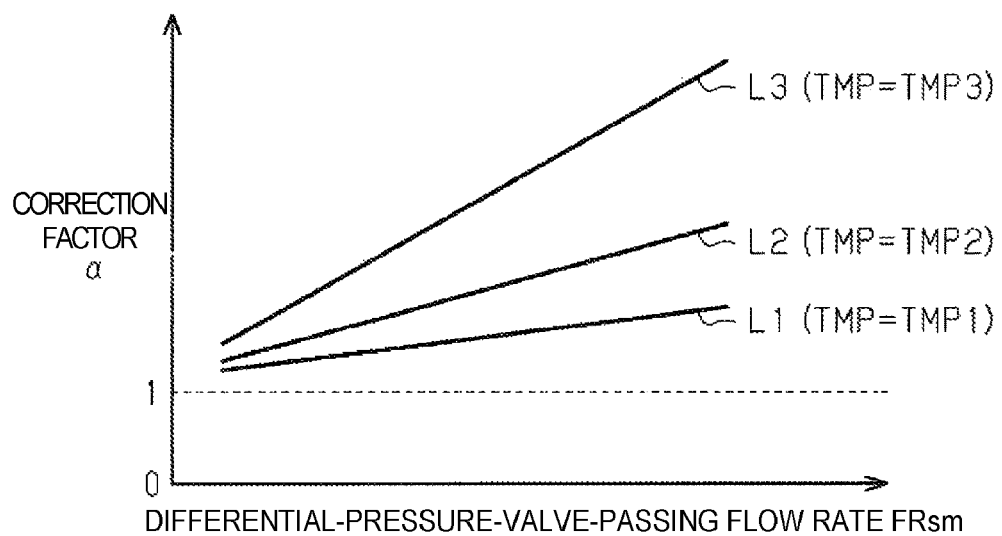
FIG. 7 is a map referred to obtain a correction factor for correcting the differential-pressure-valve differential pressure.

The map shown in FIG. 7 shows a brake fluid temperature TMP, the differential-pressure-valve passing flow rate FRsm and a correction factor α, which is a factor for correcting the differential-pressure-valve differential pressure DPsm. Among characteristic lines L1, L2, L3 shown in FIG. 7, the first characteristic line L1 represents a relationship between the differential-pressure-valve passing flow rate FRsm and the correction factor α when the brake fluid temperature TMP is a first temperature TMP1. Among the characteristic lines L1, L2, L3, the second characteristic line L2 represents a relationship between the differential-pressure-valve passing flow rate FRsm and the correction factor α when the brake fluid temperature TMP is a second temperature TMP2 lower than the first temperature TMP1. Among the characteristic lines L1, L2, L3, the third characteristic line L3 represents a relationship between the differential-pressure-valve passing flow rate FRsm and the correction factor α when the brake fluid temperature TMP is a third temperature TMP3 lower than the second temperature TMP2. Also, at any brake fluid temperatures TMP, the larger the differential-pressure-valve passing flow rate FRsm is, the higher the correction factor α becomes. Also, if the differential-pressure-valve passing flow rates FRsm are the same, the lower the brake fluid temperature TMP is, the higher the correction factor α becomes.

The differential pressure derivation unit 144 selects a characteristic line corresponding to a temperature of the brake fluid flowing through the braking actuator 60 at the current point in time, derives a value corresponding to the differential-pressure-valve passing flow rates FRsm based on the characteristic line, and then employs the value as the correction factor α. Then, the differential pressure derivation unit 144 corrects the differential-pressure-valve differential pressure DPsm calculated at the step S22 by multiplying the differential-pressure-valve differential pressure DPsm by the correction factor α. Therefore, the differential pressure derivation unit 144 can derive the differential-pressure-valve differential pressure DPsm in such a manner that the larger the obtained correction factor α is, the higher the differential-pressure-valve differential pressure DPsm becomes.

Meanwhile, the brake fluid temperature TMP can be estimated, for example, based on an outside air temperature, an operating time of the pump 68 and the like. Of course, the braking actuator 60 may be provided with a sensor for detecting a temperature of the brake fluid and thus may be configured to calculate a temperature TMP based on the results detected by the sensor.

Returning to FIG. 3, once the differential-pressure-valve differential pressure DPsm is corrected, the process proceeds to the next step S24. Then, at the step S24, the intermediate fluid pressure Pmid is calculated by the holding valve operating unit 145. That is, the holding valve operating unit 145 obtains as the intermediate fluid pressure Pmid the sum of the MC pressure Pmc and the differential-pressure-valve differential pressure DPsm. Then, at the next step S25, the command opening degree Ino for the holding valve 64 is set by the holding valve operating unit 145, based on the holding-valve differential pressure DPno, which is a difference obtained by subtracting the WC pressure command value PwcI(N) set at the step S20 from the intermediate fluid pressure Pmid calculated at the step S24. For example, the holding valve operating unit 145 sets the command opening degree Ino by referring to the map shown in FIG. 4. In this case, the larger the holding-valve differential pressure DPno is, the smaller the command opening degree Ino becomes. Once the command opening degree Ino is set by the second opening degree derivation process, the process proceeds to the next step S26.

At the step S26, the holding valve operating unit 145 controls driving of the holding valve 64 at the command opening degree Ino derived at steps S13, S18 or S25. Then, at the next step S27, the cycle factor N is incremented by "1". Thereafter, the present process routine is ended for the moment.

Figure 8:
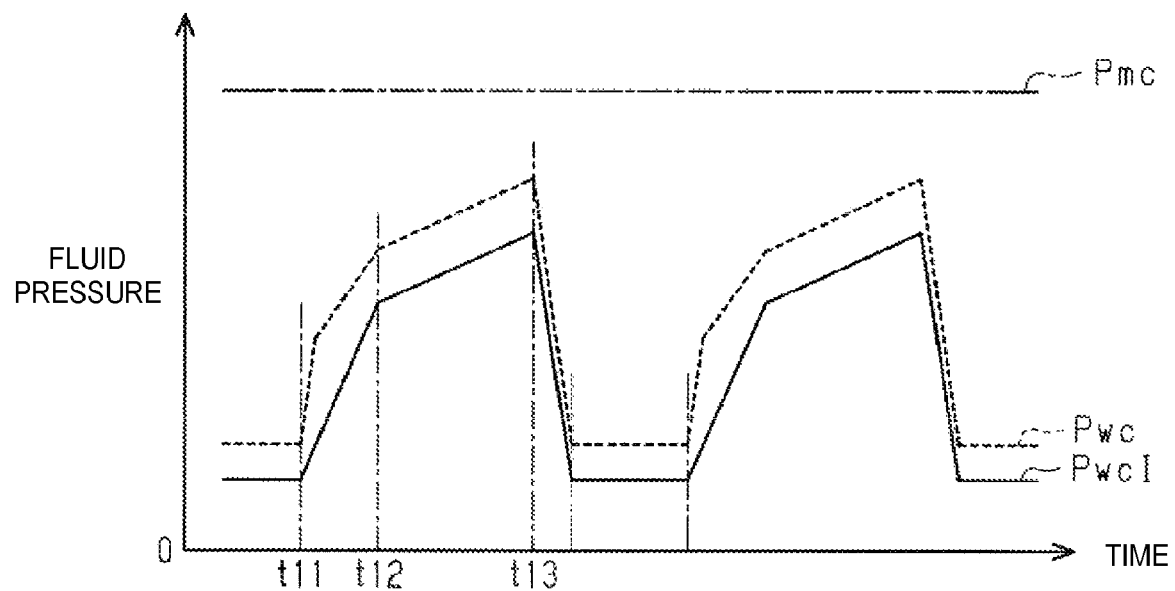
FIG. 8 is a timing chart showing changes in a fluid pressure in the case of a comparative example.
Figure 9:
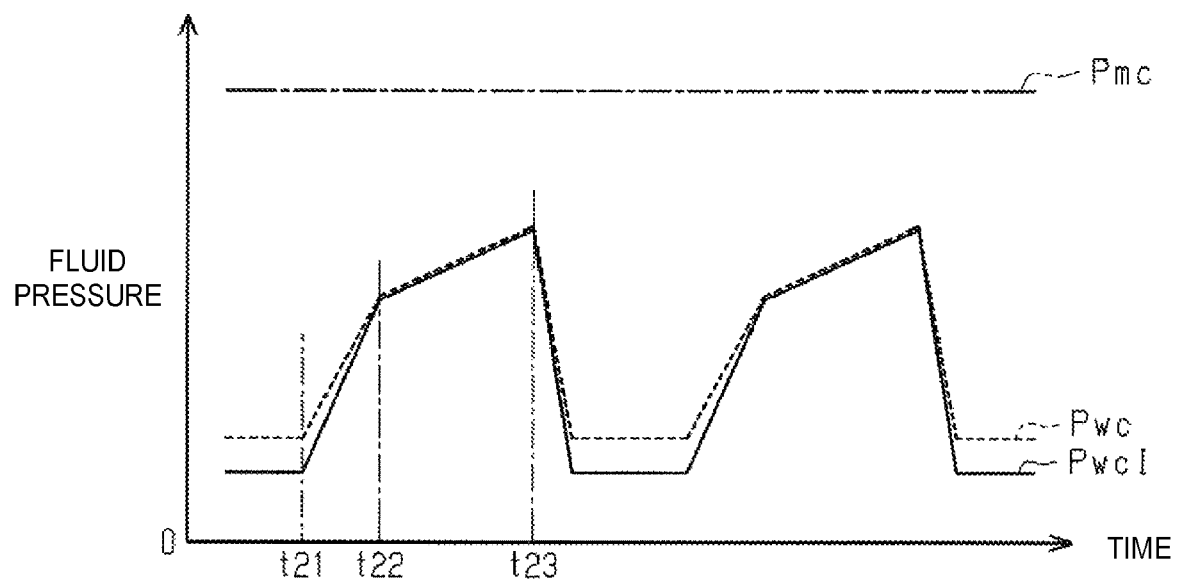
FIG. 9 is a timing chart showing changes in a fluid pressure in the case of the embodiment.

Next, with reference to FIGS. 8 and 9, operations when the holding valve 64 is driven in the prescribed control state will be described together with effects. Meanwhile, examples shown in FIGS. 8 and 9 are a case where the anti-lock brake control is executed in the prescribed control state. Also, FIG. 8 shows a comparative example, in which the command opening degree Ino for the holding valve 64 is derived under the assumption that the differential-pressure-valve differential pressure DPsm is not generated in spite of the prescribed control state. On the other hand, FIG. 9 shows the present embodiment, in which the differential-pressure-valve differential pressure DPsm is calculated and the command opening degree Ino for the holding valve 64 is derived by taking the differential-pressure-valve differential pressure DPsm into account.

In the comparative example shown in FIG. 8, the WC pressure Pwc is remained up to a timing t11 during execution of the anti-lock brake control even while the pump 68 is being operated, since both the holding valve 64 and the pressure reducing valve 65 have been closed. Then, during a period of time from the timing t11 to a timing t13, an opening degree of the holding valve 64 is adjusted to increase the WC pressure Pwc. That is, during a period of time from the timing t11 to a timing t12, the WC pressure command value PwcI is early increased to quickly increase a braking force on the wheels 10. Also, during a period of time from the timing t12 to the timing t13, the WC pressure command value PwcI is gently increased since the braking force on the wheels 10 has been already increased to same extent.

When the WC pressure Pwc is increased as in the period of time from the timing t11 to the timing t13, the comparative example derives the command opening degree Ino for the holding valve 64 under the assumption that the differential-pressure-valve differential pressure DPsm is "0". Therefore, when the opening degree of the holding valve 64 is gradually increased to increase the WC pressure Pwc, a gap between the WC pressure command value PwcI and the actual WC pressure Pwc occurs by an amount corresponding to a differential-pressure-valve differential pressure which is actually generated.

In contrast, the present embodiment shown in FIG. 9 derives the command opening degree Ino for the holding valve 64 under the assumption that the differential-pressure-valve differential pressure DPsm is not "0". However, at the timing t21, the holding valve 64 has been closed. Thus, in the case where the holding valve 64 has been closed and hence the brake fluid does not flow through the holding valve 64 to the wheel cylinder 21 side, i.e., in the case where the holding-valve passing flow rate FRno is "0", the present embodiment derives the command opening degree Ino by the first opening degree derivation process. That is, the correction value ΔPof is set to a value corresponding to a predicted value of a differential-pressure-valve differential pressure generated when the holding valve 64 has been closed, and then the sum of the correction value ΔPof and the MC pressure Pmc is regarded as the intermediate fluid pressure Pmid. Then, the command opening degree Ino is derived based on the holding-valve differential pressure DPno, which is a difference obtained by subtracting the WC pressure command value PwcI from the intermediate fluid pressure Pmid.

The command opening degree Ino derived in this way is smaller than the command opening degree Ino in the comparative example. Therefore, by driving the holding valve 64 at the command opening degree Ino, it is possible to inhibit the opening degree of the holding valve 64 from being excessively increased. That is, it is possible to inhibit an excessive increase in the WC pressure Pwc immediately after the holding valve 64 is opened.

Further, when the holding valve 64 is driven at the command opening degree Ino derived by the first opening degree derivation process, a command opening degree Ino is derived by the second opening degree derivation process. That is, the differential-pressure-valve differential pressure DPsm is calculated based on the pump discharge flow rate FRpmp and the holding-valve-passing flow rate FRno.

For example, when as in a period of time from a timing t21 to a timing t22, the WC pressure command value PwcI is relatively small and also an increase rate of the WC pressure command value PwcI is large, a flow rate of the brake fluid flowing through the holding valve 64 to the wheel cylinder 21 side in a flow rate of the brake fluid discharged from the pump 68 is larger and a flow rate of the brake fluid flowing through the differential pressure adjustment valve 62 to the master cylinder 51 side is smaller. Therefore, a pressure loss of the brake fluid flowing through the differential pressure adjustment valve 62 to the master cylinder 51 side is small. As a result, the derived differential-pressure-valve differential pressure DPsm is relatively small.

On the other hand, for example, when as in a period of time from the timing t22 to a timing t23, the WC pressure command value PwcI is relatively large and also the increase rate of the WC pressure command value PwcI is small, a flow rate of the brake fluid flowing through the holding valve 64 to the wheel cylinder 21 side in the flow rate of the brake fluid discharged from the pump 68 is smaller and a flow rate of the brake fluid flowing through the differential pressure adjustment valve 62 to the master cylinder 51 side is larger. Therefore, a pressure loss of the brake fluid flowing through the differential pressure adjustment valve 62 to the master cylinder 51 side is large. As a result, the derived differential-pressure-valve differential pressure DPsm is relatively large.

In the present embodiment, if the differential-pressure-valve differential pressure DPsm can be derived as described above, the command opening degree Ino for the holding valve 64 is derived using the differential-pressure-valve differential pressure DPsm. Then, the intermediate fluid pressure Pmid, which is the sum of the derived differential-pressure-valve differential pressure DPsm and the MC pressure Pmc, is calculated. Then, the command opening degree Ino is derived based on the holding-valve differential pressure DPno, which is a difference obtained by subtracting the WC pressure command value PwcI from the intermediate fluid pressure Pmid. That is, the command opening degree Ino is derived by the second derivation process. Then, the holding valve 64 is driven at the command opening degree Ino. If the command opening degree Ino can be derived by the second derivation process as described above, it is possible to inhibit a gap between the WC pressure command value PwcI and the actual WC pressure Pwc by driving the holding valve 64 at the command opening degree Ino derived by the second derivation process.

Therefore, in the case of the prescribed control state, an accuracy of the WC pressure Pwc when the opening degree of the holding valve 64 is increased can be enhanced.

Meanwhile, in the present embodiment, the differential-pressure-valve differential pressure DPsm obtained by referring to the map shown in FIG. 6 is corrected by the brake fluid temperature TMP. The reason is that the lower the brake fluid temperature TMP and thus the lower the viscosity of the brake fluid is, the larger the pressure loss when the brake fluid passes through the differential pressure adjustment valve 62 to the master cylinder 51 side becomes. Thus, by driving the holding valve 64 at the command opening degree Ino derived using the differential-pressure-valve differential pressure DPsm obtained by taking the brake fluid temperature TMP into account as described above, it is possible to more accurately control the WC pressure Pwc.

Meanwhile, the foregoing embodiments may be modified into other embodiments as follows.

Upon execution of anti-lock brake control, the WC pressure Pwc is quickly increased immediately after the holding valve 64 is opened. Therefore, upon execution of anti-lock brake control, when an increase in the WC pressure Pwc is started by releasing a state where the holding valve 64 is closed, the holding valve 64 may not be driven at the command opening degree Ino derived by the first opening degree derivation process. For example, upon execution of anti-lock brake control, when an increase in the WC pressure Pwc is started by releasing the state where the holding valve 64 is closed, as in the conventional case, a difference obtained by subtracting the WC pressure command value PwcI from the MC pressure Pmc may be regarded as the holding-valve differential pressure DPno and then the command opening degree Ino may be derived based on the holding-valve differential pressure DPno. For example, in the process routine described with reference to FIG. 3, if closing of the holding valve 64 is not instructed (S14: NO), the process proceeds to the step S20 regardless of whether or not the fully closed flag FLG is ON, thereby realizing the above configuration.

The differential-pressure-valve differential pressure DPsm derived based on the differential-pressure-valve-passing flow rate FRsm may not be corrected by the brake fluid temperature TMP. In this case, the command opening degree Ino derived based the holding-valve differential pressure DPno calculated using the differential-pressure-valve differential pressure DPsm may be corrected by the brake fluid temperature TMP and then the holding valve 64 may be driven at the corrected command opening degree Ino. For example, the lower the brake fluid temperature TMP is, the smaller the command opening degree Ino is corrected to become, and then the holding valve 64 is driven at the corrected command opening degree Ino, thereby allowing the WC pressure Pwc to be more accurately controlled.

In the foregoing embodiment, the holding-valve-passing flow rate FRno is derived using the WC pressure command value PwcI (N) and the previous WC pressure command value PwcI (N−1). However, if a means for estimating or detecting the WC pressure Pwc is separately provided, the holding-valve-passing flow rate FRno may be derived based on a value obtained by the means. For example, if a sensor for detecting the WC pressure Pwc is provided on a vehicle, the holding-valve-passing flow rate FRno may be derived using a detected value of the WC pressure detected by the sensor and a previous detected value of the WC pressure.

When the holding valve 64 has been closed under the situation of the prescribed control state, the differential-pressure-valve differential pressure DPsm is expected to be increased as the pump discharge flow rate FRpmp is increased. Therefore, the correction value ΔPof used in the first opening degree derivation process may be increased as the pump discharge flow rate FRpmp is increased.

When the holding valve 64 has been closed under the situation of the prescribed control state, the differential-pressure-valve differential pressure DPsm is expected to be increased as the brake fluid temperature TMP is decreased. Therefore, the correction value ΔPof used in the first opening degree derivation process may be increased as the brake fluid temperature TMP is decreased.

The first opening degree derivation process is a process executed when an increase in the WC pressure Pwc is started by releasing the state where the holding valve 64 is closed. In the first opening degree derivation process, the command opening degree Ino may be derived by any techniques different from the foregoing embodiment as long as it is possible to inhibit the opening degree of the holding valve 64 from being rapidly increased when releasing the state where the holding valve 64 is closed. For example, in the first opening degree derivation process, a target command opening degree InoT is first derived by executing the same processing as that in steps S20 to S25 in the process routine described with reference to FIG. 3. A change rate of the opening degree of the holding valve 64 when opening the holding valve 64 so that the command opening degree for the closed holding valve 64 becomes equal to the target command opening degree InoT is set to a predetermined change rate. In this case, in the first opening degree derivation process, the command opening degree Ino for the holding valve 64 is then changed toward the target command opening degree InoT in such a manner that the change rate of the opening degree of the holding valve 64 is smaller than the predetermined change rate. For example, the command opening degree Ino may be changed such that the command opening degree Ino becomes equal to the target command opening degree InoT when a period of time elapsed from the start of driving of the holding valve 64 by execution of the first opening degree derivation process reaches a predetermined period of time. Alternatively, the command opening degree Ino may be adjusted in a preset pattern, thereby changing the command opening degree Ino to the target command opening degree InoT. Meanwhile, in this case, if the command opening degree Ino becomes equal to the target command opening degree InoT, driving of the holding valve 64 is controlled at the command opening degree Ino derived by the second opening degree derivation process.

The invention claimed is:

1. A brake control device for a vehicle to be applied to a brake device of the vehicle, the brake device comprising a differential pressure adjustment valve arranged between a master cylinder and wheel cylinders provided for respective wheels; a holding valve arranged between the differential pressure adjustment valve and the wheel cylinders; and a pump for discharging a brake fluid between the differential pressure adjustment valve and the holding valve, wherein if a control state where the differential pressure adjustment valve is not driven and also the brake fluid is discharged from the pump is referred to as a prescribed control state, the brake control device comprises:

a wheel fluid pressure derivation unit for deriving a fluid pressure in the wheel cylinders every control cycle;

a passing-flow-rate derivation unit for deriving a holding-valve-passing flow rate based on a fluid pressure and a previous fluid pressure in the wheel cylinders derived by the wheel fluid pressure derivation unit in the prescribed control state, wherein the holding-valve-passing flow rate is an amount of the brake fluid flowing through the holding valve to a wheel cylinder side thereof in accordance with a change in fluid pressure in the wheel cylinders;

a differential pressure derivation unit for deriving a differential pressure between a master cylinder side and a wheel cylinder side of the differential pressure adjustment valve in the prescribed control state in such a manner that the differential pressure is increased as a difference obtained by subtracting the holding-valve-passing flow rate derived by the passing-flow-rate derivation unit from a brake fluid discharge flow rate of the pump is increased; and a holding valve operating unit for executing an opening degree derivation process of deriving a command opening degree for the holding valve and also for driving the holding valve at the command opening degree derived by the opening degree derivation process in the prescribed control state, in such a manner that the command opening degree is decreased as a difference obtained by subtracting the fluid pressure in the wheel cylinders derived by the wheel fluid pressure derivation unit from the sum of the differential pressure derived by the differential pressure derivation unit and a fluid pressure in the master cylinder is increased.

2. The brake control device according to claim 1, wherein the differential pressure derivation unit derives the differential pressure in such a manner that the lower a temperature of the brake fluid flowing through the brake device is, the higher the differential pressure between the master cylinder side and the wheel cylinder side of the differential pressure adjustment valve becomes.

3. The brake control device according to claim 1, wherein the holding valve operating unit is configured to execute an additional opening degree derivation process of deriving the command opening degree for the holding valve, based on a difference obtained by subtracting the fluid pressure in the wheel cylinders derived by the wheel fluid pressure derivation unit from a sum obtained by adding a correction value to the fluid pressure in the master cylinder, wherein the holding valve operating unit is configured:

in the prescribed control state, to drive the holding valve at the command opening degree derived by the additional opening degree derivation process when an increase in the fluid pressure in the wheel cylinders is started by releasing a state where the holding valve is closed; and to drive the holding valve at the command opening degree derived by the opening degree derivation process when the state where the holding valve is closed has been released and also the opening degree of the holding valve has been changed.

4. The brake control device according to claim 2, wherein the holding valve operating unit is configured to execute an additional opening degree derivation process of deriving the command opening degree for the holding valve, based on a difference obtained by subtracting the fluid pressure in the wheel cylinders derived by the wheel fluid pressure derivation unit from a sum obtained by adding a correction value to the fluid pressure in the master cylinder, wherein the holding valve operating unit is configured:

in the prescribed control state, to drive the holding valve at the command opening degree derived by the additional opening degree derivation process when an increase in the fluid pressure in the wheel cylinders is started by releasing a state where the holding valve is closed; and to drive the holding valve at the command opening degree derived by the opening degree derivation process when the state where the holding valve is closed has been released and also the opening degree of the holding valve has been changed.

* * * * *